US012717132B2

(12) United States Patent
Song et al.

(10) Patent No.: US 12,717,132 B2
(45) Date of Patent: Aug. 25, 2026

(54) IMAGING MODULE COMPRISING A GLUED LENS SET HAVING FIRST AND SECOND PHASE RETARDERS AND HEAD MOUNT DISPLAY

(71) Applicant: GOERTEK OPTICAL TECHNOLOGY CO., LTD., Weifang (CN)

(72) Inventors: Wenbao Song, Shandong (CN); Tonglei Zhao, Shandong (CN); Shu Guan, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 291 days.

(21) Appl. No.: 18/574,982

(22) PCT Filed: Nov. 29, 2021

(86) PCT No.: PCT/CN2021/134044
§ 371 (c)(1),
(2) Date: Dec. 28, 2023

(87) PCT Pub. No.: WO2023/273137
PCT Pub. Date: Jan. 5, 2023

(65) Prior Publication Data
US 2024/0302651 A1 Sep. 12, 2024

(30) Foreign Application Priority Data
Jun. 28, 2021 (CN) ........................ 202110730950.X

(51) Int. Cl.
*G02B 27/00* (2006.01)
*G02B 25/00* (2006.01)
(Continued)

(52) U.S. Cl.
CPC ....... *G02B 27/0018* (2013.01); *G02B 25/001* (2013.01); *G02B 27/283* (2013.01); *G06F 1/163* (2013.01)

(58) Field of Classification Search
None
See application file for complete search history.

(56) References Cited

U.S. PATENT DOCUMENTS

2018/0031835 A1* 2/2018 Hoppe ................. G02B 27/283
2019/0018255 A1* 1/2019 Qin ...................... G02B 27/283
2019/0265467 A1* 8/2019 Yun ................. B29D 11/00644

FOREIGN PATENT DOCUMENTS

CN 105572894 B 5/2016
CN 110161699 A * 8/2019 ......... G02B 27/0101
(Continued)

*Primary Examiner* — Paul C Lee
(74) *Attorney, Agent, or Firm* — Baker Botts LLP

(57) ABSTRACT

Disclosed are an imaging module and a head mount display, wherein, the imaging module comprises a display screen, a glued lens set, a first phase retarder and a polarizer. The display screen has a light-emergent surface for emitting light. The glued lens set is provided in a light-emergent direction of the display screen and comprises a first lens and a second lens which are glued and sequentially provided along a propagation direction of light. The first phase retarder is provided on a light-incident surface of the first lens. The polarizer is provided on a surface of the first phase retarder facing away from the first lens.

12 Claims, 4 Drawing Sheets

(51) Int. Cl.
*G02B 27/28* (2006.01)
*G06F 1/16* (2006.01)

(56) References Cited

FOREIGN PATENT DOCUMENTS

| | | | |
|---|---|---|---|
| CN | 110161699 | B | 8/2019 |
| CN | 110196493 | A | 9/2019 |
| CN | 110308559 | A | 10/2019 |
| CN | 113359303 | A | 9/2021 |
| CN | 113391452 | A | 9/2021 |
| CN | 113467092 | A | 10/2021 |
| CN | 113985615 | A | 1/2022 |
| CN | 114047633 | A | 2/2022 |

* cited by examiner

IMAGING MODULE COMPRISING A GLUED LENS SET HAVING FIRST AND SECOND PHASE RETARDERS AND HEAD MOUNT DISPLAY

CROSS-REFERENCE TO RELATED APPLICATIONS

The present disclosure is a National Stage of International Application No. PCT/CN2021/134044, filed on Nov. 29, 2021, which claims priority to claims priority to Chinese patent application No. 202110730950.X, filed on Jun. 28, 2021, which are incorporated herein by reference in their entireties.

TECHNICAL FIELD

The present disclosure relates to the field of optical display technology, and in particular to an imaging module and a head mount display.

BACKGROUND

In a head mount display (HMD), in order to reduce the volume of the whole device, a catadioptric optical path is usually designed inside the head mount display, so that light is propagated back and forth many times in a limited space, resulting in magnification in its imaging. In order to ensure that the light can be refracted and reflected smoothly, the light emitted by a display screen needs to have a uniform polarization state. Therefore, polarization conversion devices are provided on display screens. However, these polarization conversion devices are in direct contact with air, and cause reflection of light passing therethrough. Such reflected light is liable to image another virtual image at a human eye, resulting in ghosting and degrading clarity of a displaying picture that a user may obtain.

SUMMARY

In view of the above, aiming at the problem that it is liable to cause ghosting and degrade clarity of a displaying picture that a user may obtain when the light passes through these polarization conversion devices which are provided on the existing display screen, it is necessary to provide an imaging module and a head mount display intended for reducing ghosting and ensuring users a clear imaging picture.

To achieve the above objective, the present disclosure proposes an imaging module, comprising:

a display screen with a light-emergent surface for emitting light;

a glued lens set provided in a light-emergent direction of the display screen and comprising a first lens and a second lens which are glued and sequentially provided along a propagation direction of light;

a first phase retarder provided on a light-incident surface of the first lens; and a polarizer provided on a surface of the first phase retarder facing away from the first lens.

Optionally, the imaging module further comprises:

a beam-splitter provided between the first phase retarder and the first lens;

a second phase retarder provided between the first lens and the second lens; and a polarization reflector provided on a light-emergent surface of the second lens, wherein the transmission axis of the polarizer is orthogonal to the transmission axis of the polarization reflector.

Optionally, the first phase retarder and the second phase retarder are both quarter-wave plates.

Optionally, the imaging module further comprises a third phase retarder provided between the polarizer and the display screen.

Optionally, the first lens is one of a flat lens, a concave-convex lens, a biconvex lens, or a biconcave lens.

Optionally, the second lens is one of a plano-convex lens a concave-convex lens or a biconvex lens, and the light-emergent surface of the second lens is a convex surface.

Optionally, the imaging module further comprises a third lens, which is provided on a side of the glued lens set facing away from the display screen and is a positive lens.

Optionally, a direction perpendicular to a direction of the optical axis of the imaging module is defined as a height direction, the first lens has a height of D1, the second lens has a height of D2, and the third lens has a height of D3, then satisfying:

D3<D2, and D3<D1.

Optionally, the glued lens set is provided on the light-emergent surface of the display screen;

or, the glued lens set is provided spaced apart from the display screen.

In addition, in order to solve the above problem, the present application also provide a head mount display, which comprises a housing and the above imaging module, and the imaging module is provided within the housing.

In the technical solution proposed in the present embodiment, the light emitted by the display screen is emitted toward the first lens of the glued lens set. The light passes through the polarizer and the first phase retarder in turn. Since the first phase retarder is provided between the polarizer and the first lens, the optical surface of the first phase retarder avoids contact with the air, thus reducing the reflection of the light. It is further known that the polarizer is provided on the surface of the first phase retarder facing away from the first lens. When the light is reflected as it encounters the polarizer, it is also reflected in a direction away from the human eye. It is also known that even if the light, when projected from the display screen toward the first phase retarder, is reflected at the surface of the first phase retarder, it is also reflected in a direction away from the human eye. As can be seen, in the case where the first phase retarder avoids contact with the air and reduces reflections, the direction of reflection is still away from the human eye, which further reduces the reflected light into the human eye, thereby reducing ghosting and ensuring the user to obtains a clear displaying picture.

BRIEF DESCRIPTION OF THE DRAWINGS

In order to clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

DESCRIPTION OF REFERENCE SIGNS

Figure 1:
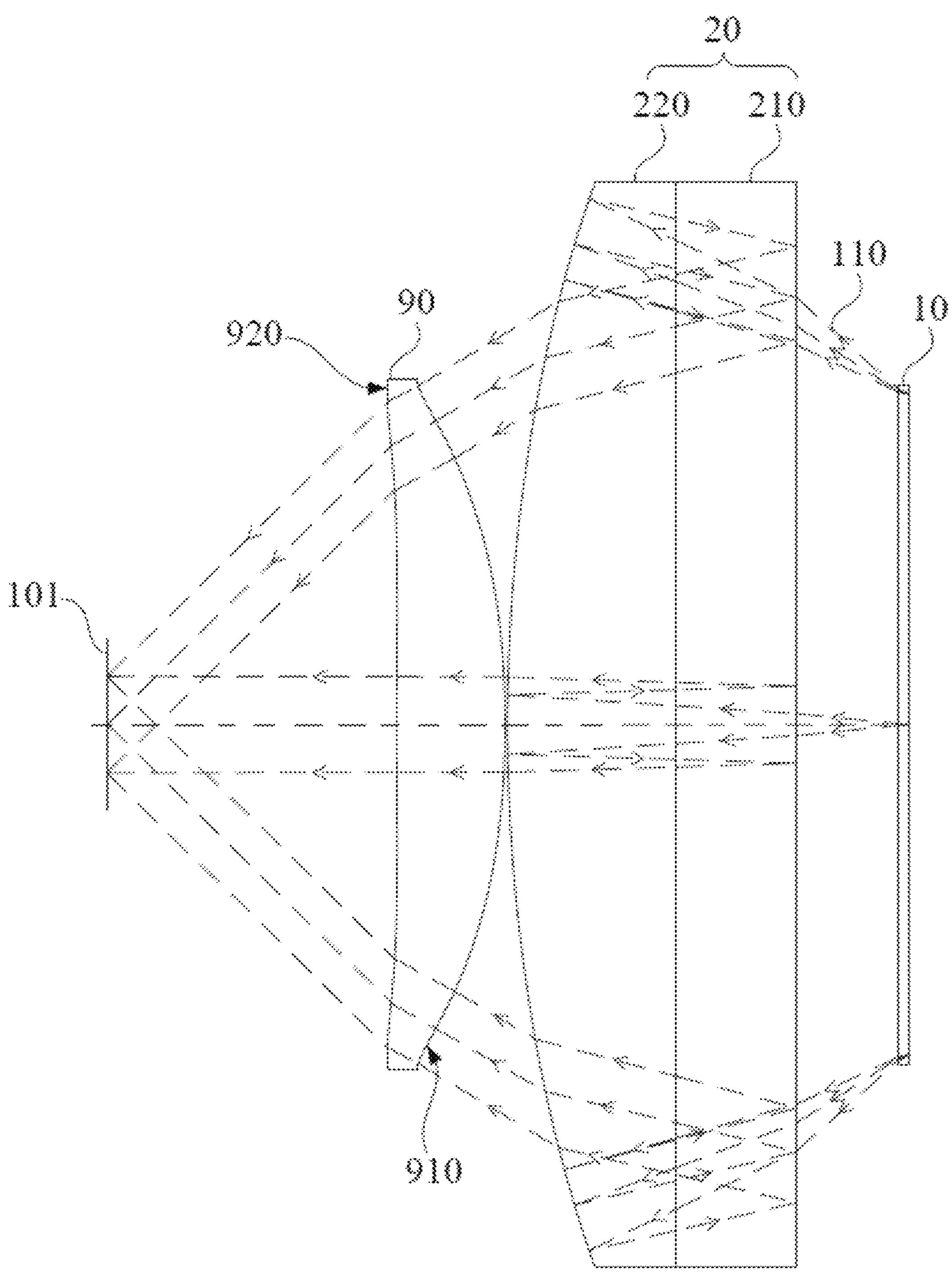
FIG. 1 shows a schematic structural illustration of an optical module in an embodiment of the present application.

| No. | Name |
|---|---|
| 10 | display screen |
| 101 | human eye |
| 110 | light |
| 20 | glued lens set |
| 210 | first lens |
| 211 | light-incident surface of the first lens |
| 212 | light-emergent surface of the first lens |
| 220 | second lens |
| 221 | light-incident surface of the second lens |
| 222 | light-emergent surface of the second lens |
| 30 | first phase retarder |
| 40 | polarizer |
| 50 | beam-splitter |
| 60 | second phase retarder |
| 70 | polarization reflector |
| 80 | third phase retarder |
| 90 | third lens |

The implementation of the objects, functional features and advantages of the present disclosure will be further described in connection with the embodiments, with reference to the accompanying drawings.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

It should be noted that all directional indications (such as up, down, left, right, front, back . . . ) in the embodiment of the present application are used only to explain the relative positional relationship, movement, etc., between the parts in a particular attitude (as shown in the accompanying drawings), and the directional indications are changed accordingly if that particular attitude is changed.

In addition, terms "first" and "second" involved in the present application are only used for descriptive purposes and should not be understood as indicating or implying relative importance or implying a number of indicated technical features. Therefore, a feature delimited with "first", "second" may expressly or implicitly include at least one of those features. In a description of the present application, "a plurality" means at least two, such as two, three, etc., unless expressly and specifically defined otherwise.

In the present application, unless expressly specified and limited otherwise, terms "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present application can be understood according to specific situations.

In addition, the technical solutions between the various embodiments of the present application may be combined with each other, but it must be based on the fact that it can be realized by a person of ordinary skill in the art. When the combination of technical solutions appears to be contradictory or unattainable, it should be considered that such combination of technical solutions does not exist and is not within the scope of protection claimed in the present application.

The polarization conversion devices are provided in the head mount display and are in direct contact with air. For example, a phase sensor is a type of the polarization conversion devices. Light will be reflected when passing through the phase sensor, and the reflectivity of each optical surface of the phase sensor is 4% to 5%. Even if an anti-reflection film is provided, the reflectivity is still about 0.5%, and this part of reflected light is liable to image another virtual image at the human eye, and may also form stray light, which may degrade clarity of a displaying picture that a user may obtain.

Figure 2:
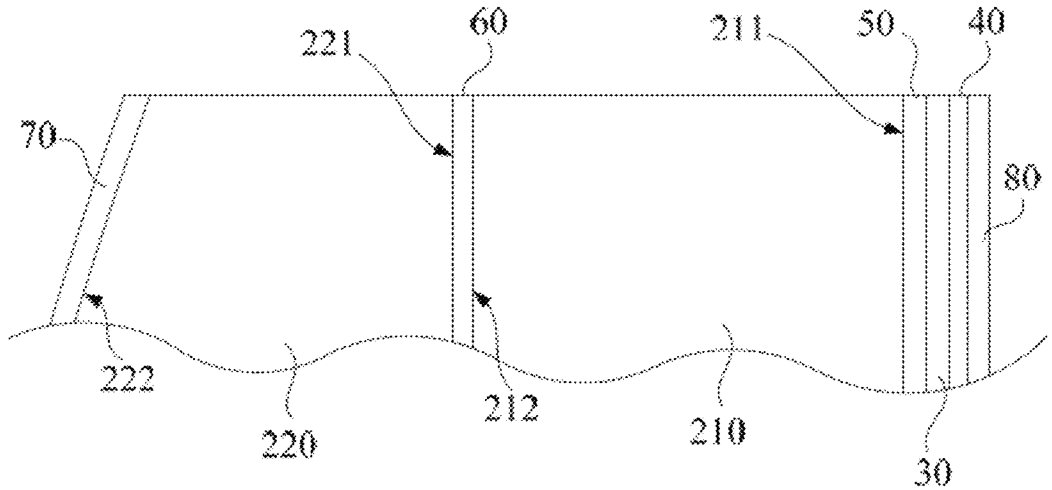
FIG. 2 is a schematic structural illustration of a portion of the glued lens set in FIG. 1.

In order to solve the above problem, please refer to FIGS. 1 and 2, the present disclosure provides an imaging module, which comprises a display screen 10, a glued lens set 20, a first phase retarder 30, and a polarizer 40. The display screen 10 is configured for emitting light. The first phase retarder 30 and the polarizer 40 are provided between the display screen 10 and the glued lens set 20.

The display screen 10 has a light-emergent surface for emitting light 110; wherein, the display screen 10 includes a variety of display principles. For example, the principle of the display screen 10 includes LCD (Liquid Crystal Display), or LED (Light Emitting Diode), OLED (Organic Light-Emitting Diode), Micro-OLED (Micro-Organic Light-Emitting Diode), ULED (Ultra). Light Emitting Diode), or DMD (Digital Micromirror Device), etc.

The glued lens set 20 is provided in a light-emergent direction of the display screen 10 and comprise a first lens 210 and a second lens 220 which are glued and sequentially provided along a propagation direction of light 110; the light-emergent surface in the display screen 10 is small in area, and in order to ensure that the user obtains an magnified displaying picture, the light 110 needs to be magnified, and the glued lens set 20 serves to enlarge and resolve the light 110, so as to ensure that the user obtains a clear picture that can be recognized.

The first phase retarder 30 is provided on a light-incident surface 211 of the first lens 210; the first phase retarder 30 serves to change the polarization state of the light 110, for example, to convert linearly polarized light into circularly polarized light, or to convert circularly polarized light into linearly polarized light. Of course, the first phase retarder 30 may also convert elliptically polarized light.

The polarizer 40 is provided on a surface of the first phase retarder 30 facing away from the first lens 210. The polarizer 40 functions to polarize the light 110 so that the light 110 passing through the polarizer 40 has a uniform polarization state. The first phase retarder 30 and the polarizer 40 may be a laminated film structure which facilitates the reduction of the size of the imaging module. Wherein, the first phase retarder 30 and the polarizer 40 may be affixed to the surface of the first lens 210 by optical adhesive. The first phase retarder 30 and the polarizer 40 can also be coated onto the surface of the first lens 210 sequentially by means of coating. In addition to this, the first phase retarder 30 and the polarizer 40 are separate optical elements, which are also provided by using optical adhesive for bonding.

In the technical solution proposed in the present embodiment, the light 110 emitted by the display screen 10 is emitted toward the first lens 210 of the glued lens set 20. The light 110 passes through the polarizer 40 and the first phase retarder 30 in turn. Since the first phase retarder 30 is provided between the polarizer 40 and the first lens 210, the optical surface of the first phase retarder 30 avoids contact with the air and reduces the optical medium that passes through, thus reducing the reflection of the light 110. It is further known that the polarizer 40 is provided on the surface of the first phase retarder 30 facing away from the first lens 210. When the light 110 is reflected as it encounters the polarizer 40, it is also reflected in a direction away from the human eye 101. It is also known that even if the light 110, when projected from the display screen 10 toward the first phase retarder 30, is reflected at the surface of the first phase retarder 30, it is also reflected in a direction away from the human eye 101. As can be seen, in the case where the first phase retarder 30 avoids contact with the air and reduces reflections, the direction of reflections is still away from the human eye 101, which further reduces the reflected light 110 into the human eye 101, thereby reducing ghosting and ensuring users a clear displaying picture.

In the above embodiment, the imaging module further comprises: a beam-splitter 50, a second phase retarder 60 and a polarization reflector 70. The beam-splitter 50 is provided between the first phase retarder 30 and the first lens 210; when passing through the beam-splitter 50, a part of the light 110 is reflected while the other part of the light 110 is transmitted. The ratio of reflection to transmission may be 1:1, 2:1, or 1:2. For example, the beam-splitter 50 may be a polarization-reflecting film. The beam-splitter 50 may be bonded between the first phase retarder 30 and the first lens 210 by an optical adhesive. The beam-splitter 50 may also be coated on the surface of the first phase retarder 30 or on the surface of the first lens 210 by means of coating. The second phase retarder 60 is provided between the first lens 210 and the second lens 220, and the optical axis thereof and the transmission axis of the polarizer 40 form an angle of 45° therebetween, which may be positive 45° or negative 45°. The second phase retarder 60 is also a laminated film structure, and can be bonded between the first lens 210 and the second lens 220. The beam-splitter 50 may also be coated on the surface of the first lens 210 or on the surface of the second lens 220 by means of coating.

The polarization reflector 70 is provided on a light-emergent surface 222 of the second lens, and a transmission axis thereof is orthogonal to that of the polarizer 40. Similarly, the polarization reflector 70 may also be a laminated film structure, and may be bonded onto the second lens 220 by an optical adhesive. Alternatively, the beam-splitter 50 may be coated on the surface of the second lens 220 by means of coating. In addition, the orthogonality of the transmission axis of the polarizer 40 and that of the polarization reflector 70 ensures that the light 110 is refracted and reflected inside the imaging module. Specifically, the display screen 10 emits the light 110, and after the emitted light 110 passes through the polarizer 40 and the first phase retarder 30 in sequence, the polarization state of the light 110 is circularly polarized light. The light 110 first passes through the beam-splitter 50 when emitted toward the first lens 210, a part of the light 110 is transmitted while the other part of the light 110 is reflected. The light 110 transmitted through the beam-splitter 50 continues to propagate and is emitted toward the second phase retarder 60 after passing through the first lens 210, and the polarization state of the circularly polarized light 110 is changed from the circularly polarized light to the linearly polarized light. The linearly polarized light 110 is transmitted through the second lens 220 and emitted toward the polarization reflector 70. At this time, the oscillation direction of the linearly polarized light is different from the direction of the transmission axis of the polarization reflector 70, and the light 110 is reflected. The reflected light 110 passes through the second lens 220, the second phase retarder 60 and the first lens 210 in sequence, is emitted toward the beam-splitter 50 again; when passing through the beam-splitter 50 again, the light 110 is partly emitted toward the first lens 210. At this time, the light 110 is circularly polarized light, and after being reflected, the polarization handedness thereof is changed, and the light 110 is again converted to linearly polarized light after passing through the second phase retarder 60 again. At this time, the polarization direction of the linearly polarized light is the same as that of the transmission axis of the polarization reflector 70, and in this process, the diameter of the optical path is continuously magnified. Through multiple refractions and reflections of the light 110, the enlargement and transmission of the image is achieved in a limited space, which advantageously reduces the volume of the imaging module. The bonding mode makes the operation simple, and the coating mode makes the film layer firm.

Further, in order to effectively ensure conversion of the light 110 between the circular polarization state and the linear polarization state, both the first phase retarder 30 and the second phase retarder 60 are quarter-wave plates. The linearly polarized light 110 is converted into circularly polarized light after passing through the quarter-wave plate. The circularly polarized light 110 is converted into linearly polarized light after passing through the quarter-wave plate.

In the above embodiment, the polarizer 40 is a linear polarizer, and the light 110 emitted by the display screen 10 may have a plurality of polarization states, such as circularly polarized light, elliptically polarized light, or linearly polarized light, or a combination of one or two of the three, and it may also be natural light. After passing through the polarizer 40, the light 110 is converted into linearly polarized light with the same polarization direction, and with the uniform polarization state of the light 110, it is also convenient for the subsequent refraction and reflection of the light 110.

In an embodiment of the present disclosure, after the light 110 emitted by the display screen 10 encounters the polarizer 40, in addition to light 110 transmitted through the polarizer 40, a part of the light 110 is reflected, and this part of the light 110 is reflected again after being emitted toward the display screen 10, which is liable to generate stray light degrading the display screen 10. In order to further reduce stray light, the imaging module further comprises a third phase retarder 80 provided between the polarizer 40 and the display screen 10. The optical axis of the third phase retarder and the transmission axis of the polarizer 40 form an angle of 45°, which may be positive 45° or negative 45°. Wherein, the third phase retarder 80 may also be a quarter-wave plate.

The light 110 reflected by the polarizer 40 is converted into circularly polarized light after passing through the third phase retarder 80, and after being reflected by the display screen 10, the polarization handedness of the circularly polarized light is changed from left rotation to right rotation, or from right rotation to left rotation. After the light 110 passes through the third phase retarder again, the circularly polarized light is converted into linearly polarized light, and the polarization direction of the linearly polarized light is perpendicular to the transmission axis of the polarizer 40, so that the light 110 cannot pass through the polarizer 40, thereby reducing the generation of stray light.

Further, in order to enable the glued lens set 20 to play a role of analyzing imaging, the first lens 210 is one of a flat lens, a concave-convex lens, a biconvex lens, or a biconcave lens. When the first lens 210 is a flat lens, the light-incident surface 211 of the first lens and the light-emergent surface 212 of the first lens are both flat surfaces and are parallel. With the flat optical surface, it is beneficial to setup of the first phase retarder 30 and the polarizer 40. When the first lens 210 is the concave-convex lens, it is possible that the concave faces toward the display screen 10 or the convex faces toward the display screen 10. There are many types of concave-convex lenses, such as meniscus lenses. The concave surface enables the passing light to diverge, which facilitates magnifying the diameter of the optical path. When the first lens 210 is the biconvex lens, the light 110 may be effectively converged. When the first lens 210 is the biconcave lens, the light 110 may be effectively diverged.

Further, there are also various types of the second lens 220, and specifically, the second lens 220 is one of a plano-convex lens, a concave-convex lens or a biconvex lens. When the second lens 220 is the plano-convex lens, the light-incident surface 221 of the second lens is a flat surface and the light-emergent surface 222 of the second lens is a convex surface. When the second lens 220 is the concave-convex lens, the concave-convex lens may be a meniscus lens, and the light-incident surface 221 of the second lens is a concave surface while the light-emergent surface 222 of the second lens is a convex surface. When the second lens 220 is the biconvex lens, the light-incident surface 221 of the second lens and the light-emergent surface 222 of the second lens are convex surfaces. By virtue of the convex arrangement of the light-emergent surface 222 of the second lens, the light 110 is effectively focused toward the position of the human eye 101. With the convex arrangement of the light-emergent surface 222 of the second lens, it is possible to cause the light 110 to effectively converge and image at the position of the human eye 101.

In another embodiment of the present disclosure, the imaging module further comprises a third lens 90 provided on a side of the glued lens set 20 facing away from the display screen 10. The third lens 90 is a positive lens which has a positive optical focus, that is, the light 110 will converge to the position of the optical axis of the imaging module after passing through the third lens 90, thereby further ensuring that the light 110 converges and images at the position of the human eye 101. In addition, the third lens 90 may also be glued to the glued lens set 20, facilizing reduction of the volume of the imaging module.

Figure 3:
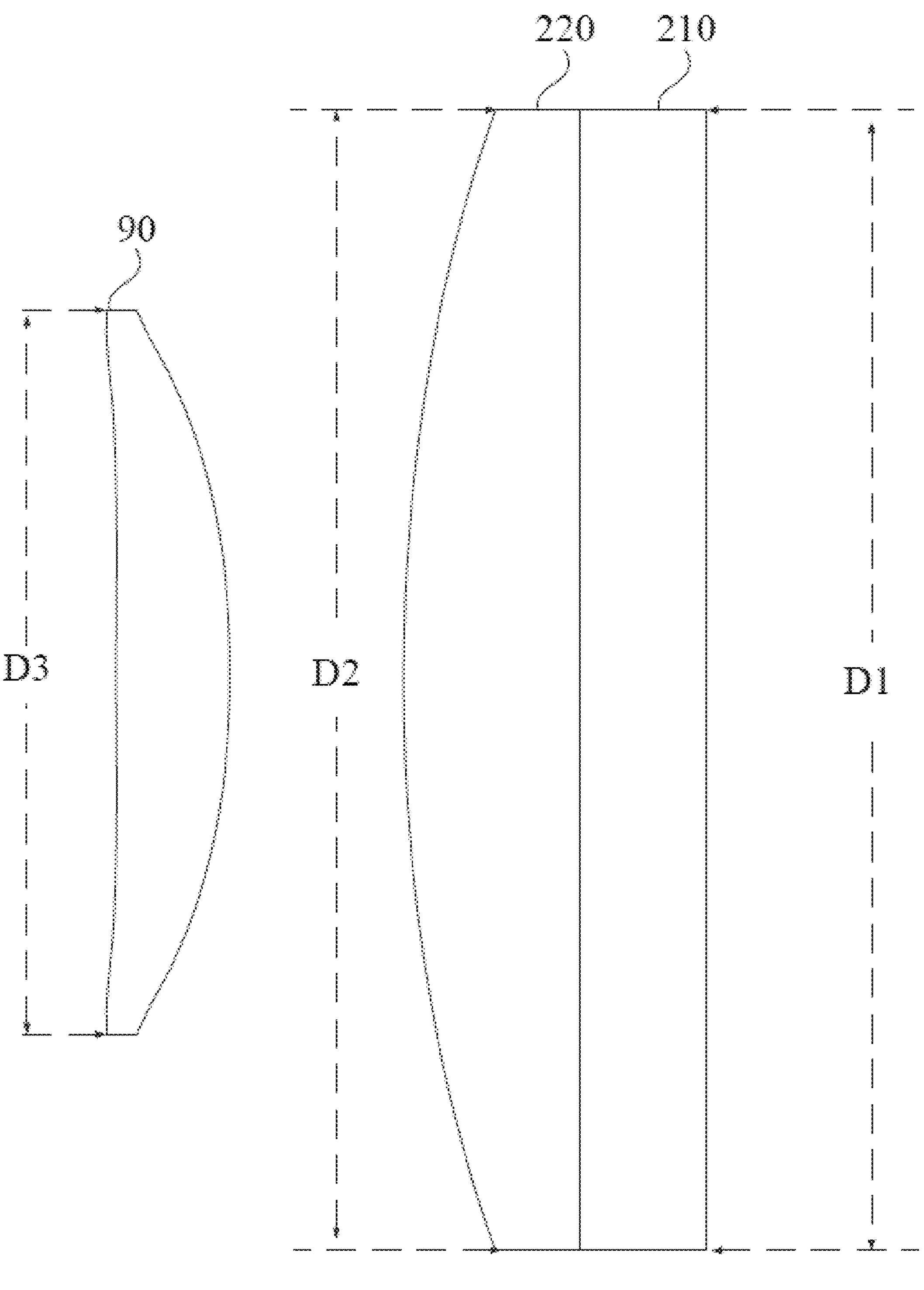
FIG. 3 is a schematic diagram showing the height of the lens in FIG. 1.

Referring to FIG. 3, in order to reduce the volume of the imaging module, a direction perpendicular to a direction of the optical axis of the imaging module is defined as a height direction, and a direction parallel to the direction of the optical axis is defined as a horizontal direction. The first lens 210 has a height of D1, the second lens 220 has a height of D2, and the third lens 90 has a height of D3, then satisfying: D3<D2, and D3<D1. It can be seen that the effective height dimension of the third lens 90 is smaller than the effective height dimensions of the first lens 210 and the second lens 220. In this way, the light 110 needs to be bent at a large angle in the direction of the optical axis of the imaging module when the light 110 is emitted toward the third lens 90. In addition, since the third lens 90 is a positive lens, the position where the light 110 is converged is closer to the imaging module, and thus, the imaging position is closer. The overall size of the imaging module is compact and user-friendly.

In the above embodiment, there are at least two cases where the glued lens set 20 is provided, the first case being that the glued lens set 20 is provided on the light-emergent surface of the display screen 10. In this way, the light 110 directly enters the glued lens set 20 after being emitted by the display screen 10 to avoid the propagation of the light 110 in the atmosphere, so as to reduce the optical medium through which the light 110 passes, thereby reducing the reflection of the light 110 and reducing the absorption of the light 110 by the optical medium.

Besides, the second case is that the glued lens set 20 is provided spaced apart from the display screen 10. In this way, it is possible to expand the propagation distance of the light 110, increase the optical path, and enable the light 110 to have a sufficient catadioptric path, thereby enabling the light 110 to be sufficiently magnified and resolved for imaging.

Table 1 lists the specific parameters of one embodiment of the imaging module and gives the corresponding coefficients for calculating the optical surface.

TABLE 1

| part | material | surface | thickness/ spacing (mm) | radius of curvature (mm) | 4th aspheric coefficient | 6th aspheric coefficient | 8th aspheric coefficient |
|---|---|---|---|---|---|---|---|
| human eye 101 | / | / | 12 | infinite | / | / | / |
| third lens 90 | PMMA | light-emergent surface 920 | 4.5 | 196.5 | −6.95E−05 | 6.80E−07 | −4.42E−09 |
| | | light-incident surface 910 | 0 | −41.7 | −6.94E−05 | 4.83E−07 | 3.88E−09 |
| polarization reflector 70 | / | light-emergent surface | 0.08 | 72.3 | −2.71E−06 | 1.14E−08 | −1.78E−11 |
| | | light-incident surface | 0 | 72.3 | −2.71E−06 | 1.14E−08 | −1.78E−11 |
| second lens 220 | PMMA | light-emergent surface 222 of the second lens | 7 | 72.3 | −2.71E−06 | 1.14E−08 | −1.78E−11 |

TABLE 1-continued

| part | material | surface | thickness/ spacing (mm) | radius of curvature (mm) | 4th aspheric coefficient | 6th aspheric coefficient | 8th aspheric coefficient |
|---|---|---|---|---|---|---|---|
| | | light-incident surface 221 of the second lens | 0 | infinite | / | / | / |
| second phase retarder 60 | / | light-emergent surface | 0.08 | infinite | / | / | / |
| | | light-incident surface | 0 | infinite | / | / | / |
| first lens 210 | PMMA | light-emergent surface 212 of the first lens | 5 | infinite | / | / | / |
| | | light-incident surface 211 off the first lens | 0 | infinite | / | / | / |
| first phase retarder 30 | / | light-emergent surface | 0.08 | infinite | / | / | / |
| | | light-incident surface | 0 | infinite | / | / | / |
| polarizer 40 | / | light-emergent surface | 0.08 | infinite | / | / | / |
| | | light-incident surface | 4.2 | infinite | / | / | / |
| display screen 10 | BK7 | light-emergent surface | 0.5 | infinite | / | / | / |
| | | light-incident surface | 0 | infinite | / | / | / |

Figure 4:
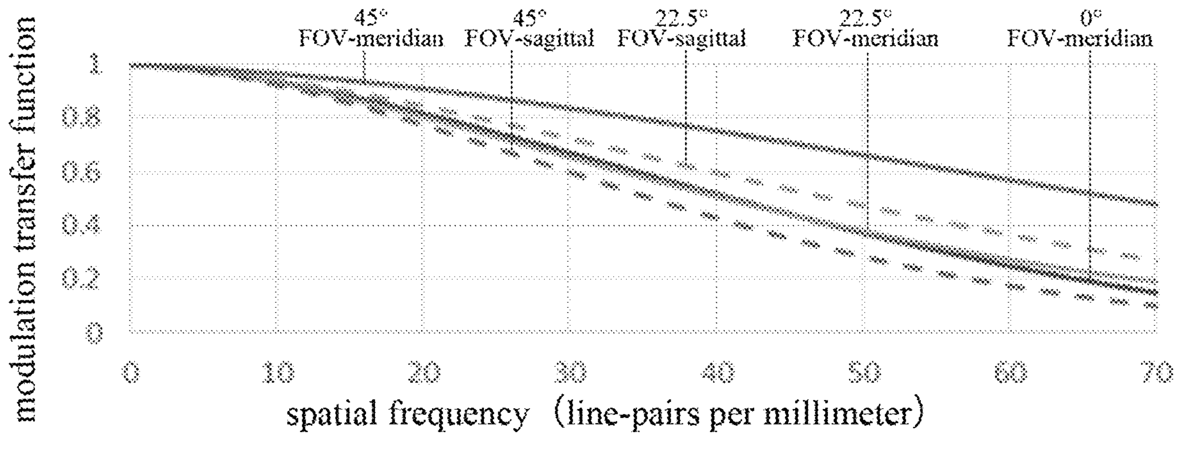
FIG. 4 is a graph of modulation transfer function of the imaging module in FIG. 1 at 450 nm.
Figure 5:
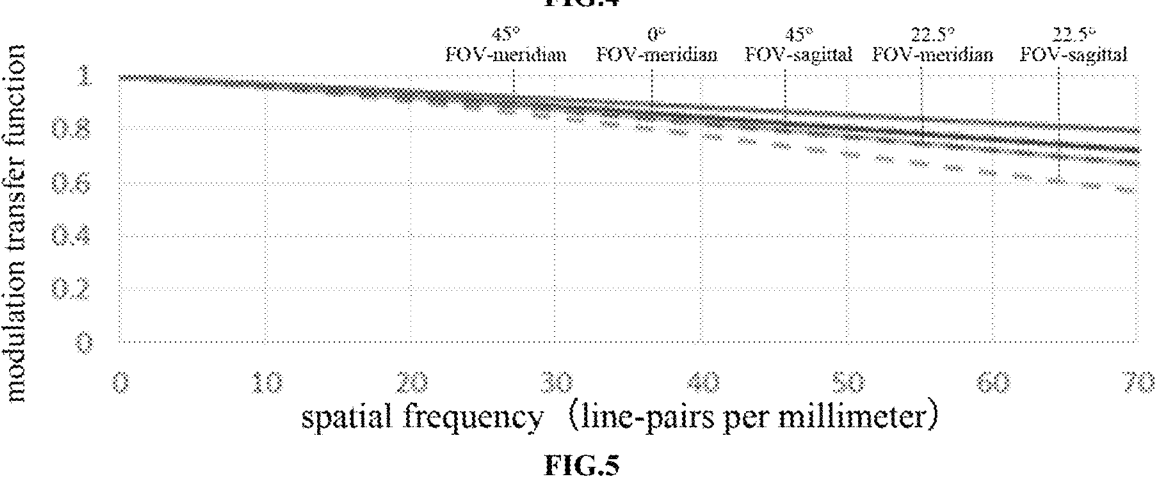
FIG. 5 is a graph of modulation transfer function of the imaging module in FIG. 1 at 550 nm.
Figure 6:
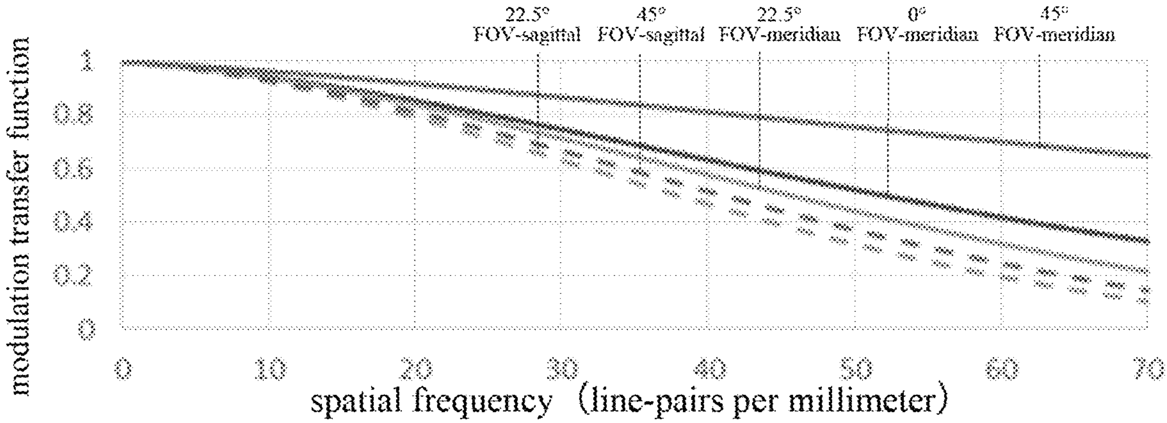
FIG. 6 is a graph of modulation transfer function of the imaging module in FIG. 1 at 610 nm.

In addition, with respect to the above embodiment, FIGS. 4, 5 and 6 show graphs of the modulation transfer function (MTF) of the imaging module in the present embodiment at 450 nm, 540 nm, and 610 nm, respectively, wherein the MTF map shows the relationship between the modulation index and the number of line-pairs per millimeter in the image, which is used to evaluate the ability to restore the details of the scene. It can be seen from the figure that at a spatial frequency of 70 of line-pairs per millimeter, the MTF value of the imaging module is higher than 0.55 at a wavelength of 540 nm, and the MTF value of the imaging module is higher than 0.1 at a wavelength of 450 nm and at a wavelength of 610 nm. In the range of the main field of view, the MTF value is greater than 0.55, and the resolution is good.

In the present embodiment, the phase retarder 30 and the polarizer 40 are attached to the rear surface of the lens 210, thereby eliminating the interface of the phase retarder 30 with air; and the surface reflectivity of the phase retarder 30 is reduced to less than 0.1%, so that the intensity of stray light due to the surface reflection of the phase retarder 30 can be reduced by about 80%.

The present disclosure also provides a head mount display which comprises a housing and the above imaging module, and the imaging module is provided within the housing. The housing provides a mounting space to support the imaging module, and the imaging module is provided within the housing so as to prevent water vapor or dust from the external environment from falling into the interior of the imaging module.

The embodiment of the head mount display in the present disclosure may refer to each embodiment of the above-mentioned imaging module, and will not be repeated herein.

The above are only preferred embodiments of the present disclosure, and are not intended to limit the patent scope of the present application. Any equivalent structural transformations made by utilizing the specification of the present application and the accompanying drawings under the concept of the present application or directly/indirectly applying them in other related technical fields shall be included in the scope of patent protection of the present disclosure.

The invention claimed is:

1. An imaging module, comprising:

a display screen with a light-emergent surface for emitting light in a light-emergent propagation direction;

a glued lens set provided in the light-emergent propagation direction, comprising a first lens and a second lens which are glued and sequentially provided along the propagation direction;

a first phase retarder provided on a light-incident surface of the first lens;

a polarizer provided on a surface of the first phase retarder facing away from the first lens;

a beam-splitter provided between the first phase retarder and the first lens;

a second phase retarder provided between the first lens and the second lens; and a polarization reflector provided on a light-emergent surface of the second lens.

2. The imaging module of claim 1, wherein the first phase retarder and the second phase retarder are both quarter-wave plates.

3. The imaging module of claim 1, wherein the imaging module further comprises a third phase retarder provided between the polarizer and the display screen.

4. The imaging module of claim 1, wherein the first lens includes one of a flat lens, a concave-convex lens, a biconvex lens, or a biconcave lens.

5. The imaging module of claim 4, wherein the second lens includes one of a plano-convex lens, a concave-convex lens or a biconvex lens, and the light-emergent surface of the second lens is a convex surface.

6. The imaging module of claim 1, wherein the imaging module further comprises a third lens, which is provided on a side of the glued lens set facing away from the display screen and is a positive lens.

7. The imaging module of claim 6, wherein a direction perpendicular to a direction of an optical axis of the imaging module is defined as a height direction, the first lens has a height of D1, the second lens has a height of D2, and the third lens has a height of D3, then satisfying:

D3<D2, and D3<D1.

8. The imaging module of claim 1, wherein the glued lens set is provided on the light-emergent surface of the display screen; or the glued lens set is provided spaced apart from the display screen.

9. A head mount display, comprising:

a housing; and an imaging module of claim 1, which is provided within the housing.

10. The imaging module of claim 1, wherein the first phase retarder is directly bonded to the light-incident surface of the first lens by an optical adhesive, such that there is no air gap between the first phase retarder and the first lens.

11. The imaging module of claim 1, wherein a transmission axis of the polarizer is orthogonal to a transmission axis of the polarization reflector.

12. The imaging module of claim 1, wherein the polarizer is provided on the surface of the first phase retarder facing away from the first lens such that a direction of light reflected by the polarizer is away from a human eye.

* * * * *